Sept. 18, 1951 H. J. RIBLET 2,568,090

BALANCED MIXER

Filed June 22, 1948 5 Sheets-Sheet 1

INVENTOR
HENRY J. RIBLET
BY Elmer J. Gorn
ATTORNEY

Sept. 18, 1951 H. J. RIBLET 2,568,090

BALANCED MIXER

Filed June 22, 1948 5 Sheets-Sheet 2

INVENTOR
HENRY J. RIBLET
BY Elmer J. Gorn
ATTORNEY

INVENTOR
HENRY J. RIBLET
BY Elmer J. Gorn
ATTORNEY

Sept. 18, 1951 H. J. RIBLET 2,568,090

BALANCED MIXER

Filed June 22, 1948 5 Sheets-Sheet 4

INVENTOR
HENRY J. RIBLET
BY Elmer J. Gorn
ATTORNEY

INVENTOR
HENRY J. RIBLET
BY Elmer J. Gorn
ATTORNEY

Patented Sept. 18, 1951

2,568,090

UNITED STATES PATENT OFFICE 2,568,090

BALANCED MIXER

Henry J. Riblet, Belmont, Mass., assignor to Raytheon Manufacturing Company, a corporation of Delaware Application June 22, 1948, Serial No. 34,536

15 Claims. (Cl. 250—20)

This invention relates generally to mixing circuits for radio receivers, and in particular to a novel mixer circuit employing directional couplers for independently mixing an incoming radio frequency signal and an automatic frequency control signal with the same local oscillator voltage.

In radar systems, particularly those operating in the microwave range, it is customary to employ a superheterodyne receiver wherein the received signal is mixed with a local oscillator signal, and the mixed signals are then passed into an intermediate frequency amplifier where the first amplification takes place. The I. F. amplifier has a definite band width, which necessitates that the local oscillator frequency shall be accurately controlled. It is, therefore, also now the practice to compare the transmitter oscillator frequency with the local oscillator frequency and to provide means to maintain a constant difference between them, namely, a difference that is related to the intermediate frequency. This is accomplished by mixing a sample of the transmitted signal voltage with the local oscillator voltage, and feeding the resultant difference signal into an automatic frequency control circuit which functions to tune the local oscillator to maintain the difference signal frequency constant. The use of directional couplers in radar systems to provide such circuits is described in a paper entitled "Directive Couplers in Wave Guides," by M. Surdin, published in the Journal of the Institution of Electrical Engineers, London, England, vol. 93, part IIIA, No. 4, 1946, pages 725 to 736, at page 725.

The present invention has as its main object to provide an improved balanced mixer circuit employing directional couplers, characterized by compactness and broad band width.

It is another object to provide such an improved directional coupler circuit which independently mixes local oscillator voltage with incoming signal voltage from the antenna and with automatic frequency control voltage from the transmitter.

It is another object of the invention to provide such a circuit which functions as a balanced mixer, and supplies two output voltages for each voltage that is mixed with the local oscillator voltage, the two voltages being at equal power levels. It is another object of the invention to provide such a balanced mixer circuit wherein the two voltages are suitably phased for direct use in push-pull amplification.

It is a further object of the invention to provide such a circuit which has broad-band characteristics, and wherein the power level and phase relations between pairs of output voltages remain substantially constant over the entire operating frequency band.

Other and further objects and features of the invention will become apparent from the following description of an illustrative embodiment thereof, reference being made to the accompanying drawings, wherein.

Figure 11:
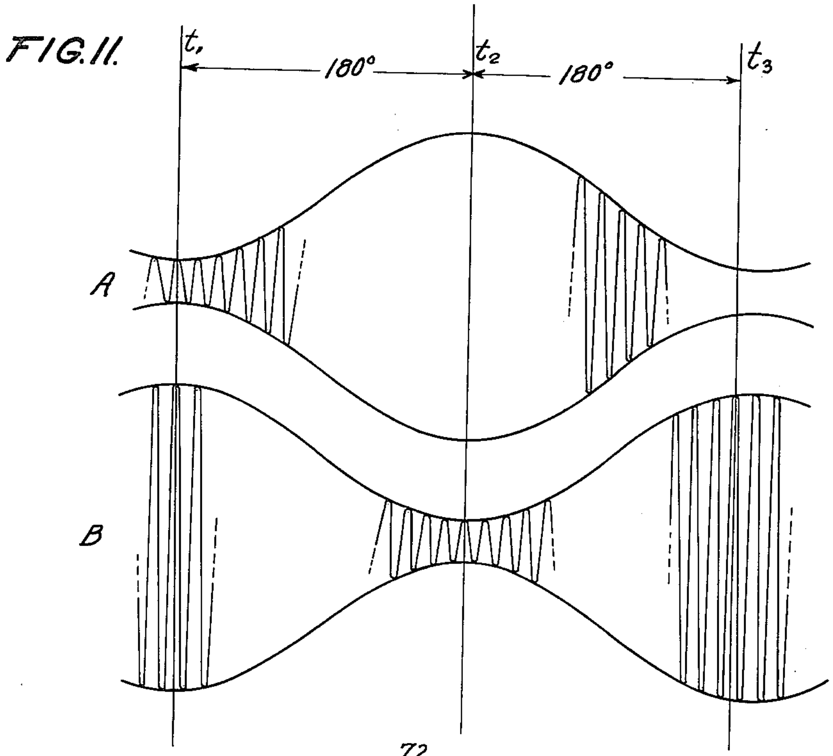

Figs. 7 to 10, inclusive, are vector diagrams illustrating the operation of the invention;

Fig. 11 is a modulation-envelope diagram illustrating the operation of the invention;

Fig. 12 is a vector diagram illustrating the operation of the invention; and

Figure 13:
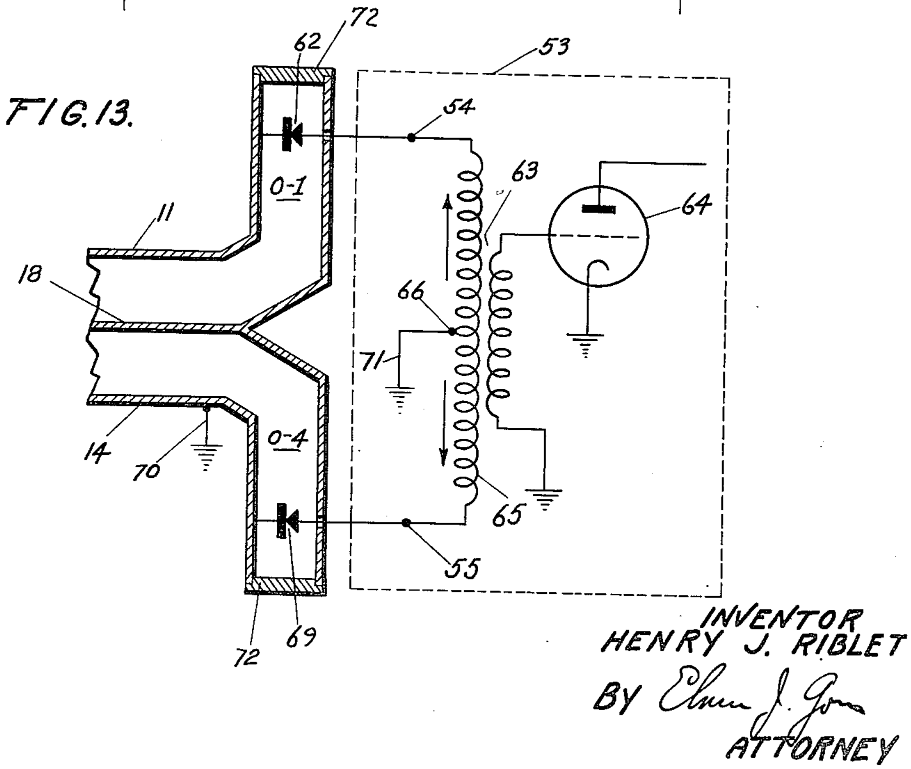

Fig. 13 illustrates the connection of the circuit of the invention to the push-pull amplifier.

Figures 1, 2:
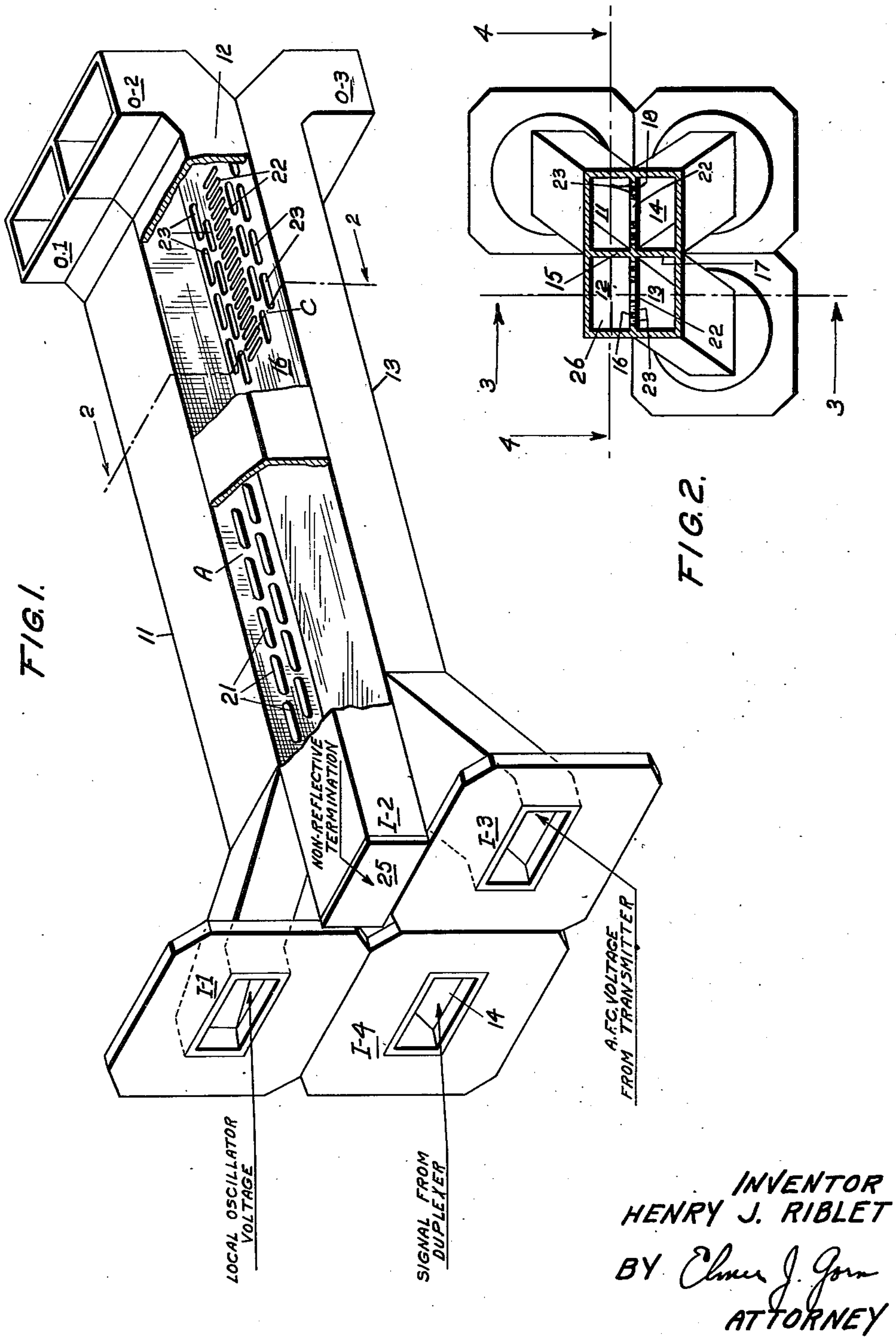
Fig. 1 is an isometric view of a mixer in accordance with the invention, with certain parts cut away to show interior structure.
Fig. 2 is a cross-sectional view on line 2—2 of Fig. 1.
Figure 3:
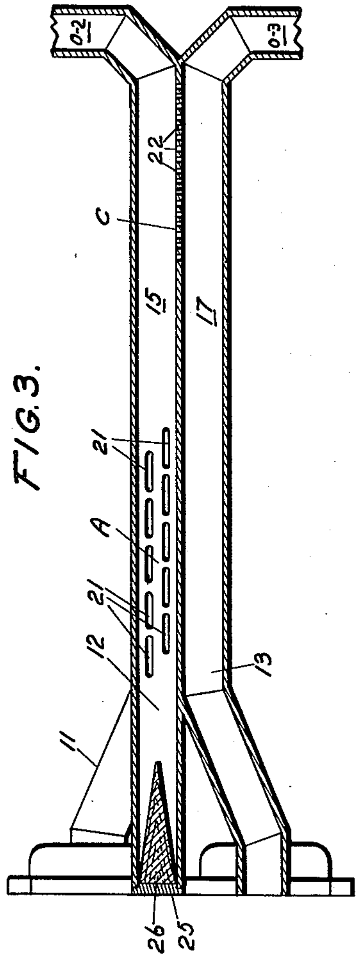
Fig. 3 is a side-sectional view on line 3—3 of Fig. 2.
Figure 4:
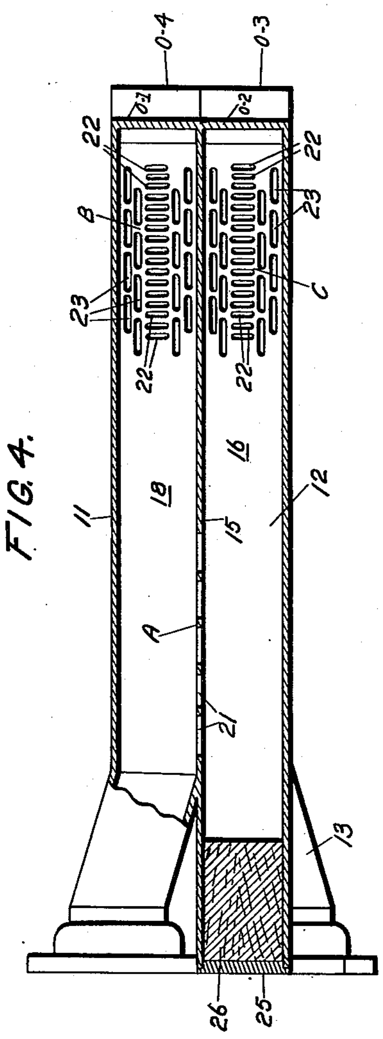
Fig. 4 is a top-sectional view on line 4—4 of Fig. 2.

Referring now to Figs. 1 to 4, inclusive, four substantially identical rectangular waveguides 11, 12, 13, and 14 are disposed parallel to each other, each with a narrow wall adjacent to that of a neighbor and a wide wall adjacent to that of a different neighbor. In the preferred form of construction, as shown in Fig. 2, the first and second waveguides 11 and 12 share a first common narrow wall 15, the second and third guides 12 and 13 share a first common wide wall 16, the third and fourth guides 13 and 14 share a second common narrow wall 17, and the fourth and first guides 14 and 11 share a second common wide wall 18. The first and second waveguides are directionally coupled together by a directional coupler A, consisting of a plurality of longitudinally disposed slots 21 cut in the first common narrow wall 15. The second and third waveguides 12 and 13 are directionally coupled together through the first common wide wall 16 by way of a second directional coupler C, of a kind which is described in detail and claimed in copending application, Serial No. 784,277, filed November 5, 1947. This coupler comprises a plurality of transversely directed slots 22 centered substantially along the center line of the wall in which they are cut, and a plurality of longitudinally directed slots 23 disposed near the edges of the wall, as shown clearly in Fig. 4. The first and fourth waveguides 11 and 14 are similarly coupled together through the second common wide wall 18 by way of a third directional coupler B, which is identical to directional coupler C. It will be recognized by those skilled in the art that the slots of directional coupler A are so directed that they are perpendicular to the current flow in the first common narrow wall 15 of power in fundamental, or $TE_{0,1}$ mode, and are, therefore, advantageously disposed to be excited by current of this mode. Directional couplers B and C are likewise intended for use with the fundamental mode, as is explained in said copending application.

Each directional coupler is dimensioned to function as a "hybrid"; that is, the coupling ratio is substantially unity, so that it couples substantially one half of the power presented to it. To this end the slots of each coupler are made nonresonant to waves at the operative frequency, so that each slot couples only a small amount of the power presented to it, and the number of slots of each coupler is then chosen to effect a coupling ratio of unity. With respect to couplers B and C, this construction is explained in detail in the aforementioned copending application, where the form of coupler in which the coupling ratio is unity is referred to as a "bridge circuit." Couplers B and C are of the species illustrated in Fig. 11 of said copending application, in order that their physical lengths may be as short as possible and the directivity as high as possible.

In order that the coupling ratio shall remain reasonably constant over the operating frequency band, it is necessary that the slots of the directional couplers shall be short with respect to the guide wavelength of the energy being carried; their lengths should not be equal to, or exceed one half, the guide wavelength of all the frequencies in the operating frequency band. Also, in order that each slot shall be excited principally by that field which gives rise to a current tending to flow across its long dimension and no other, the slots are preferably made very thin. For example, when the operating frequency band lies between the guide wavelength limits of 3.1 to 3.5 centimeters, that is, the band for which a one inch by ½ inch rectangular waveguide is best suited for carrying power in the $TE_{0,1}$ mode, the slots 21 of coupler A may each be 0.496±0.002 inch long and 0.156 inch thick. Two longitudinal rows of five slots 21 each, with about 0.040 inch between the ends of adjacent slots in each row, then provide a suitable hybrid. In couplers B and C, the transverse slots 22 may at the same time be 0.270±0.001 inch long by 0.063±0.001 inch wide, and the longitudinal slots 23 may be 0.440±0.001 inch long by 0.125±0.001 inch wide. A single row of eighteen transverse slots 22, evenly spaced about 0.120 inch apart between centers, and four rows of five longitudinal slots 23 each provide a suitable hybrid. The longitudinal slot rows are in pairs, one pair on each side of the centrally located row of transverse slots 22. For convenience in cutting them, the longitudinal slots of each pair of longitudinal slot rows are half-staggered from one row to the next, and the longitudinal spacing between the centers of a slot in one such row and a next successive slot in the other such row is conveniently about 0.240 inch. The spacing between two such rows may be about 0.040 inch. The slots 21 of coupler A are also staggered, in this case to attain optimum directivity.

As developed in the aforementioned copending application, the spacing between slots in couplers like B and C has little or no effect on the coupling ratio, but there is an improvement in directivity when the spacing is reduced. The coupling ratio is determined by the nature of the individual slots and the number of slots employed in each coupler.

In operation, input signal voltages are introduced into the first, third and fourth waveguides 11, 13 and 14, respectively, at input terminals I—1, I—3 and I—4, respectively, and output voltages are taken from the four waveguides 11, 12, 13 and 14 at output terminals O—1, O—2, O—3 and O—4, respectively, the last of which is not shown in the drawings, but is directly beneath terminal O—1. The input end I—2 of the second waveguide 12 is closed with a termination plate 25, which may conveniently be provided with a wedge-shaped piece of wave-absorbent material 26 mounted on the inner side of the plate, with the vertex directly inwardly along the axis of the waveguide. The material 26 may be hardwood or Bakelite coated with colloidal graphite, known as "Aquadag," for example, and provides a non-reflective termination that is not sensitive to frequency changes.

Figure 5:
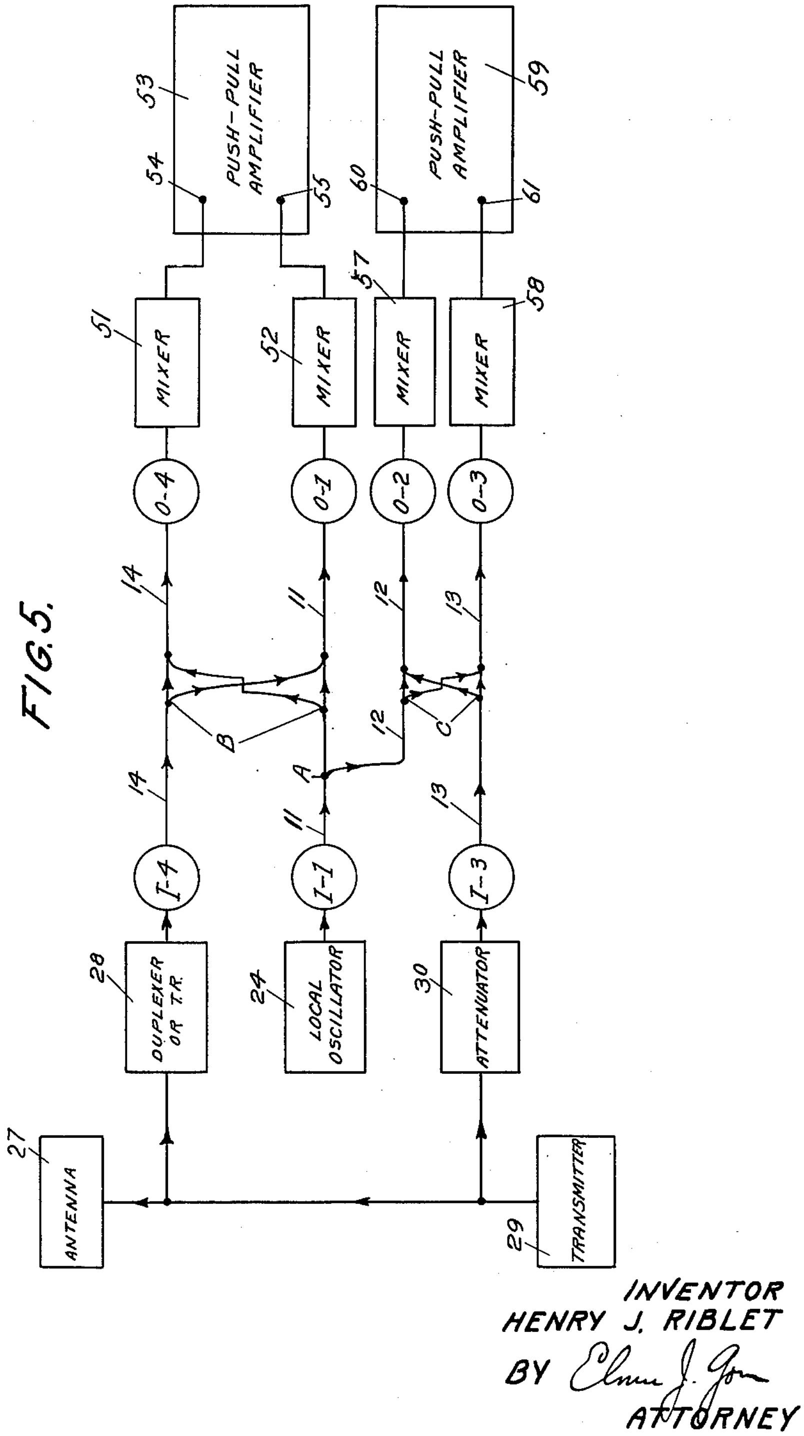
Fig. 5 is a flow diagram illustrating the operation of the invention.

The local oscillator signal is introduced at terminal I—1 from the local oscillator 24. It is desired that this signal shall be divided into four substantially equal parts which become available in all four waveguides, and accordingly one coupler, A, is placed closer to the input end of the circuit than the other couplers, B and C. As shown in Fig. 5, the local oscillator voltage encounters coupler A first, where it is substantially evenly divided between the first and second waveguides 11 and 12. In the first waveguide 11, one half of the local oscillator power then encounters coupler B, where it is substantially evenly divided into quarter portions between the first and fourth waveguides 11 and 14, respectively. In the second waveguide 12, the other half of the local oscillator power then encounters coupler C, where it is substantially evenly divided, again into quarter portions, between the second and third waveguides 12 and 13, respectively.

The received signal, which in the usual radar system is available from the antenna 27 by way of the duplexer or T—R circuit 28, is introduced at terminal I—4, and in the fourth waveguide 14 it encounters coupler B, where it is substantially evenly divided into signals of equal power between the first and fourth waveguides 11 and 14, respectively. The A. F. C. voltage from the transmitter 29 is introduced at terminal I—3 through an attenuator 30, for only a sample of the transmitted power is desired, and in the third waveguide 13, this power encounters coupler C, where it is substantially evenly divided into signals of equal power between the second and third waveguides 12 and 13, respectively.

Thus, there are available, at each of terminals O—1 and O—4, both the local oscillator and received signal voltages, with equal power at each terminal; and at each of terminals O—2 and O—3, there are both the local oscillator and A. F. C. voltages, with equal power at each terminal. The respective power divisions having been accomplished by means of directional couplers, substantially none of the input power from any of the sources is reflected back to the input terminals. The sources of the signals that are connected to input terminals I—1, I—3, and I—4 are, of course, matched to the respective waveguides 11, 13, and 14, while the termination 25 in the input end I—2 of the second waveguide 12 provides a matched termination for that end.

The output voltages available at either one of output terminals O—1 or O—4 may be provided to the mixer and I. F. amplifier components of the complete radar system, as shown, for example, in Fig. 5, while the output voltages available at either one of output terminals O—2 or O—3 may be provided to the automatic frequency control portion of the system. As has been set forth above, these arrangements are part of the complete radar system. When the intermediate frequency and automatic frequency control voltages are amplified, it is often desirable to employ push-pull amplifiers. In such cases, the outputs of terminals O—1 and O—4 are provided to two individual mixers 52 and 51, respectively, and the intermediate or difference frequency signals that are available from the mixers are provided directly to the two opposite-phase input terminals 54 and 55 of a first push-pull amplifier 53; while the outputs of terminals O—2 and O—3 are provided to two other individual mixers 57 and 58, and the difference frequency signals that are available from these two mixers are provided directly to the two opposite-phase input terminals 60 and 61 of a second push-pull amplifier 59. The difference frequency voltages that are applied to either amplifier 53 or 59 are available directly from the output terminals O—1 and O—4 or O—2 and O—3, in the proper phase relation for push-pull amplification, as will now be shown.

Considering now the first and fourth waveguides 11 and 14, respectively, it will be recalled that these are identical and directionally coupled together in a symmetrical fashion by coupler B. Accordingly, the coupler may be said to be "symmetrical." The general criteria of good operation of the symmetrical coupler are that all the power introduced at either input terminal I—1 or I—4 shall become available at both output terminals O—1 and O—4, and that none shall be available at I—1 or I—4 by reflection from the coupler. This is the ideal directivity case, and is not fully realized but is closely approached in practice. The specific criterion of good operation is that the power available at the output terminals O—1 and O—4 from any one input terminal I—1 or I—4 shall be available in equal amounts, and this criterion is substantially satisfied, being a property that can be built into the couplers, as set forth above.

Figure 6A:
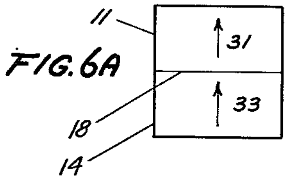
Fig. 6 is a diagram for aid in understanding the operation of the invention.
Figure 6B:
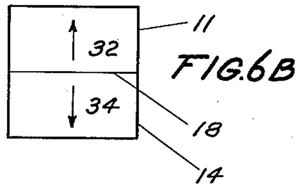

The general case for a symmetrical directional coupler can be synthesized by introducing two separate sets of waves into the input ends of the two coupled waveguides, as illustrated in Figs. 6A and 6B. As shown in Fig. 6A, two incident waves of equal intensities and symmetric, or of like phase, as represented by vectors 31 and 33, are incident upon the first and fourth waveguides 11 and 14, respectively. As shown in Fig. 6B, two additional waves, represented by vectors 32 and 34, are simultaneously incident upon the waveguides 11 and 14, respectively. These waves have the same intensities as the first two waves, but are antisymmetric or oppositely phased with respect to each other. In addition, the phasing is such that vector 32 is in phase with vector 31. Thus, there is a voltage incident at the input to the first waveguide 11, which voltage is the vector sum of two symmetric incident vectors 31 and 32, but the voltage incident at the input of the fourth waveguide 14 is zero, being the vector sum of two antisymmetric incident vectors 33 and 34 of equal magnitudes. This is the physical situation that exists when power is incident upon the first waveguide 11 and no power is incident upon the fourth waveguide 14.

Figure 7A:
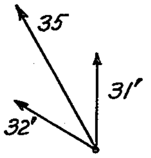
Figure 7B:
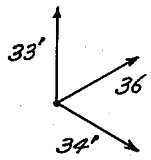

Consider now the condition of the four vectors 31, 32, 33 and 34 at the output terminals O—1 and O—4. Assuming no reflections, which is the case for ideal performance, i. e. infinite directivity, and perfect matching, all the power will arrive at the output terminals, except for very small attenuations affecting all the vectors equally. However, at the coupler B, vectors 31 and 33 generate, in effect, a symmetrical mode of transmission which is propagated in the two coupled waveguides, while vectors 32 and 34 generate, in effect, an antisymmetric mode. These two coupling modes have, in general, different phase velocities in the waveguides at the coupler, such that the net effect of the coupler B on excitations of this kind is to introduce a phase shift between the symmetric and the antisymmetric pairs of vectors. Thus, while vectors 31 and 33 maintain their initial symmetry, and vectors 32 and 34 maintain their initial antisymmetry, the phase relation between vectors of one coupling mode and those of the other coupling mode is different at the output terminals. This situation is illustrated in Fig. 7, where vectors 31′ and 33′ are symmetric, and vectors 32′ and 34′ are antisymmetric. The vectors in the first waveguide 11 at the output terminal O—1 have a resultant phase illustrated by vector 35, while the vectors in the fourth waveguide 14 at the output terminal O—4 have a resultant phase illustrated by vector 36. The phase difference between the two resultants is 90 degrees, and this is true regardless of the kind of symmetrical directional coupler that is used, or the frequency of operation.

Figure 8A:
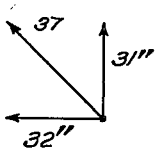
Figure 8B:
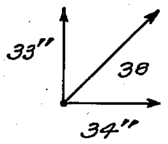

Since the symmetrical directional couplers that are employed in the invention are hybrids, the power levels at the two output terminals are equal. In Fig. 7, the two resultant vectors 35 and 36 are not equal. This is due to the length of the coupling section, however, and Fig. 8 illustrates the situation which results in equal output vectors 37 and 38. The phase difference between them is still 90 degrees, so that the hybrids may be called "quadrature hybrids." It may be seen that the electrical length of each hybrid is 90 degrees different for one coupling mode than for the other. The vectors 31″ and 32″, and 33″ and 34″, from which the resultants 37 and 38, respectively, are derived, correspond to vectors 31′ and 32′, and 33′ and 34′, respectively, in Fig. 7.

Figure 9A:
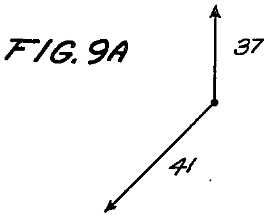
Figure 9B:
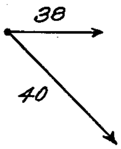

It is now clear that, due to the fact that the coupler B is a symmetrical quadrature hybrid, the local oscillator power which is introduced at input terminal I—1 is available in equal amounts at output terminals O—1 and O—4, and that the voltage at O—4 leads or lags that at O—1 by 90 degrees, regardless of the operating frequency or the type of symmetrical hybrid that is used. Similarly, with respect to the received signal from the duplexer 28, which is introduced at terminal I—4, there are two equal-power received signals at the output terminals O—1 and O—4; and the voltage at O—1 differs in phase from that at O—4 by 90 degrees, for the same symmetrical quadrature hybrid is used for coupling this signal. The equal power result follows from the fact that the hybrids of the type shown herein have extremely broad band characteristics. The local oscillator and received signal voltages have no particular phase relation, however. In fact, the local oscillator frequency is higher or lower than that of the received signal frequency by an amount which is intended to be equal to the intermediate frequency. Figs. 9A and 9B illustrate the situation with respect to these two voltages at the two output terminals O—1 and O—4, respectively. Local oscillator vector 38 in Fig. 9B lags 90 degrees behind local oscillator vector 37 in Fig. 9A, while received signal vector 41 in Fig. 9A lags 90 degrees behind received signal vector 40 in Fig. 9B. The local oscillator vectors 37 and 38 are equal to each other in magnitude, and the received signal vectors 40 and 41 are equal to each other in magnitude, but the latter two vectors are not necessarily equal to the former two in magnitude. Actually the signal voltage is ordinarily vastly weaker than the local oscillator voltage. The phase relation between vectors 37 and 40, corresponding to the signals directly connected to the input terminals I—1 and I—4, respectively, has been chosen at random.

Figures 10A, 12A:
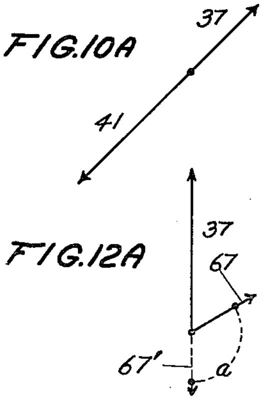
Figure 10B:
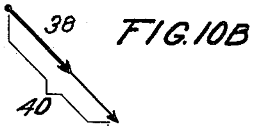

The voltages that are presented to amplifier input terminals 54 and 55 (in Fig. 5) after detection of the signals from the two output terminals are the modulation envelopes generated when the local oscillator signal modulates the received signal, or vice versa. Assuming that the local oscillator voltage is of a higher frequency than the received signal voltage, this situation can be illustrated vectorially by rotating the local oscillator vectors 37 and 38 at a constant rotational speed and by same amount with respect to the received signal vectors 41 and 40, respectively. The direction is arbitrary, and in Figs. 10A and 10B, vector 37 has been rotated clockwise until it is oppositely phased to vector 41, whereupon it is evident that vector 38, when rotated by the same amount and in the same direction with respect to vector 40, is in phase with vector 40. At this instant, the modulation envelope of the voltages from terminal O—1 has reached a minimum value, while that of the voltages from terminal O—4 has reached a maximum value. Referring now to Fig. 11, two modulation envelopes are there illustrated, that at A corresponding to the envelope generated by the vectors in Fig. 10A, and present in the mixer 52 connected to terminal O—1, and that at B corresponding to the envelope generated by the vectors in Fig. 10B and present in the mixer 51 connected to terminal O—4. Fig. 10 illustrates the instantaneous vector relations at time $t_1$ in Fig. 11. Continued rotation of vectors 37 and 38 in a clockwise direction until vector 37 is in phase with vector 41 will bring vector 38 into phase opposition with vector 40. This will result in modulation envelope A becoming a maximum and modulation envelope B becoming a minimum, at time $t_2$ in Fig. 11. The distance from a maximum to a minimum in a modulation envelope is 180 electrical degrees, as is apparent from Fig. 11, so that the modulation envelopes at A and B can yield voltages from the mixers 52 and 51, respectively, which are 180 degrees out of phase with each other. A pair of voltages so phased is suitable for direction introduction into a push-pull amplifier, as will be shown in connection with Fig. 13.

Figure 12B:
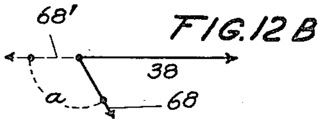

It has now been established that when two identical waveguides are directionally coupled together by a symmetrical quadrature hybrid, the simultaneous introduction of a first voltage of one frequency into the input end of one waveguide, and of a second voltage of another frequency into the input end of the other waveguide, provides voltages in the output ends of the two waveguides, of which the difference frequency in one output end differs in phase from the difference frequency in the other output end by 180 degrees. Considering now the voltages introduced into the input ends of the waveguides, and specifically the local oscillator voltage which is incident upon terminal I—1, there is usually present one or more additional voltages in the nature of noise of a different frequency or frequencies and of low amplitude. Consider, for example, a noise signal of higher frequency than that of the local oscillator voltage. At a particular instant, as shown in Fig. 12A, the local oscillator voltage, represented again by vector 37, is at the output of the first waveguide 11. A noise voltage at the output of the same waveguide is represented by vector 67. Some time later the noise, being of higher frequency, will have advanced in phase with respect to the main local oscillator voltage by some angle $a$, so that vector 67 will have assumed a new relative position with respect to vector 37, as indicated by the dotted line vector 67'. In passing through the coupler into the waveguide 14, both the main and noise voltages are delayed by the same amount, 90 degrees, as indicated by vectors 38 and 68 representing the condition at said particular instant. At the same later time, at the output terminal O—4 of the fourth waveguide 14, the noise will have advanced with respect to the main local oscillator voltage by the same angle $a$ as in the first waveguide 11, for the paths are symmetrical, so that vector 68 will have advanced with respect to vector 38 by the angle $a$ to a new position as indicated by the dotted line vector 68'. The vectors in Fig. 12B are thus in the same relative position as the vectors in Fig. 12A at all times. The modulation envelope generated when vector 67 modulates vector 37 is then maximum and minimum at the same times as that generated when vector 68 modulates vector 38, so that, at the output terminals, the two modulation envelopes, due to noise introduced into any one input terminal along with the desired input signal, are in the same phase. When the mixers 51 and 52 are connected to a push-pull amplifier circuit, as shown, for example, in Fig. 13, these noise modulation products tend to cancel each other out, as will be shown.

Referring now to Fig. 13, the output terminals O—1 and O—4 of the first and fourth waveguides 11 and 14, respectively, are shown. Crystal mixers or detectors 69 and 62 are in the output circuits of terminals O—4 and O—1, respectively, in place of the block diagram mixers 51 and 52, respectively, of Fig. 5. The free ends of the two waveguides beyond the mixers may be terminated by any suitable reactive termination, such as a suitably placed short circuit 72, as is known in the art. The amplifier 53 includes an input transformer 63 and a first amplifier tube 64. The primary winding 65 of the transformer is connected at each of its ends 54 and 55 to one of the crystals 62 or 69, respectively. The transformer terminals 54 and 55 are the input terminals of the amplifier 53. The center point 66 of the primary winding 65 is connected to the metal of the waveguides 11 and 14 by way of ground connections 70, 71. The crystals 69 and 62 are connected to the primary winding 65 in opposite sense. Consequently, the direct current that flows in the lower crystal 69 in Fig.

13 flows through the crystal, ground at 70 and 71, downward through the lower half of the primary winding 65, as shown by the lower arrow, and back to the lower crystal. Simultaneously, the direct current that flows through the upper crystal 62 flows through ground at 70 and 71 and thence upward through the upper half of the primary winding 65, as shown by the upper arrow, and back to the upper crystal 62. The two D. C. components are in sense opposition in the primary winding 65 and hence have no effect on the remainder of the amplifier circuit.

The modulation envelopes A and B of Fig. 11 are detected by the crystals and become sinusoidal variations on the D. C. which are 180 degrees out of phase with each other. Hence, the crystals being connected to the primary winding 65 in opposite sense, during one half of the alternating current cycle there is an increase in the current that flows upward in the upper half of the primary winding 65 and a simultaneous decrease in the current that flows in the lower half thereof; and during the other half cycle there is an increase in the current that flows downward in the lower half of the winding and a simultaneous decrease in the current that flows upward in the upper half thereof. The effect on the secondary winding of the transformer 63 is an alternating potential at the difference frequency.

With respect to the modulation envelopes resulting from the interaction of a desired voltage and the noise and extraneous voltages incident upon one input terminal along with said desired voltage, as has been set forth above, these appear in the same phase in the two output terminals. Hence the currents that flow in the two halves of the primary winding as a result of detection of these envelopes cancel each other as far as the secondary winding is concerned.

It is now clear that the invention provides a mixer circuit for electric waves which, of its own nature, provides an improved signal to noise ratio. The circuit is mechanically small and compact, unlike the so-called magic-Tee and Rat Race arrangements, which are characterized by a rectangular joint of one waveguide with another and elongated arms for matching and phasing purposes. The present invention makes convenient use of the fact that a symmetrical quadrature directional coupler hybrid permits waveguides to be coupled together while in a compact mutually parallel relation at the same time with all the desired electrical advantages of improving the signal to noise ratio by providing the desired and undesired voltages in different characteristic phase relation, so that one may be separated from the other.

The second and third waveguides 12 and 13 and coupler C are identical from an analytical point of view to the first and fourth waveguides 11 and 14 and their coupler B. The local oscillator signal is introduced into the second waveguide 12 by way of coupler A, but it is presented to the output terminals O—2 and O—3 in the same manner and fashion as to output terminals O—1 and O—4. The A. F. C. voltage is operated upon in the same manner as the received signal, so that the entire foregoing analysis applies with equal force to the situation at output terminals O—2 and O—3.

Many modifications of the invention will occur to those skilled in the art. For example, various other types of directional couplers can be used in the invention at the option of the user. The four waveguides 11, 12, 13 and 14 may be arranged in configurations different from that illustrated. Various other arrangements are possible, such as a flat arrangement, wherein all the waveguides are coupled through narrow walls, or a vertical arrangement, wherein all coupling is through wide walls, or variations of both of these. The embodiment illustrated is valuable for its compactness, but it will be realized that the invention includes any mechanical arrangement which provides the electrical circuit shown in Fig. 5. It should be understood that, although the drawings illustrate two balanced mixers, each of these is an embodiment of the invention in itself. It is, therefore, intended that the claims that follow shall not be limited to particular details of the embodiment of the invention herein illustrated, but shall be limited only by the prior art.

What I claim is:

1. A transmission line circuit for mixing power at one frequency individually with each of two signals each at a frequency different from said one frequency comprising: first, second, third and fourth transmission line sections, each having an input end and an output end; first symmetrical directional coupler means between said first and second sections; second symmetrical directional coupler means between said first and fourth sections; third symmetrical directional coupler means between said second and third sections; said first coupler being nearer to the input end of said first section than said second coupler and nearer to the input end of said second section than said third coupler; and an individual mixer means connected to the output end of each section.

2. A transmission line circuit for mixing power at one frequency individually with each of two signals each at a frequency different from said one frequency comprising: first, second, third, and fourth transmission line sections, each having an input end and an output end; first symmetrical directional coupler means between said first and second sections; second symmetrical directional coupler means between said first and fourth sections; third symmetrical directional coupler means between said second and third sections; said first coupler being nearer to the input end of said first section than said second coupler and nearer to the input end of said second section than said third coupler; a substantially non-reflective termination in the input end of said second section; and an individual mixer means connected to the output end of each section.

3. A transmission line circuit for mixing power at one frequency with each of two signals having frequencies different from said one frequency comprising: first, second, third and fourth transmission line sections, each having an input end and an output end; first symmetrical directional coupler means between said first and second sections; second symmetrical directional coupler means between said first and fourth sections; third symmetrical directional coupler means between said second and third sections; said couplers each having substantially a one-to-one coupling ratio; said first coupler being nearer to the input end of said first section than said second coupler and nearer to the input end of said second section than said third coupler; and an individual mixer means connected to the output end of each section.

4. A transmission line circuit for mixing power at one frequency with each of two signals having frequencies different from said one frequency comprising: first, second, third and fourth transmission line sections, each having an input end and an output end; first symmetrical directional coupler means between said first and second sections; second symmetrical directional coupler means between said first and fourth sections; third symmetrical directional coupler means between said second and third sections; said couplers each having substantially a one-to-one coupling ratio; said first coupler being nearer to the input end of said first section than said second coupler and nearer to the input end of said second section than said third coupler; a substantially non-reflective termination in the input end of said second section; and an individual mixer means connected to the output end of each section.

5. A waveguide circuit for mixing power at one frequency with each of two signals having frequencies different from said one frequency comprising: first, second, third and fourth waveguide sections, each having an input end and an output end; first symmetrical directional coupler means between said first and second sections; second symmetrical directional coupler means between said first and fourth sections; third symmetrical directional coupler means between said second and third sections; said first coupler being nearer to the input end of said first section than said second coupler and nearer to the input end of said second section than said third coupler; and an individual mixer means connected to the output end of each section.

6. A waveguide circuit for mixing power at one frequency with each of two signals having frequencies different from said one frequency comprising: first, second, third and fourth waveguide sections, each having an input end and an output end; first symmetrical directional coupler means between said first and second sections; second symmetrical directional coupler means between said first and fourth sections; third symmetrical directional coupler means between said second and third sections; said first coupler being nearer to the input end of said first section than said second coupler and nearer to the input end of said second section than said third coupler; a substantially non-reflective termination in the input end of said second section; and an individual mixer means connected to the output end of each section.

7. A waveguide circuit for mixing power at one frequency with each of two signals having frequencies different from said one frequency comprising: first, second, third and fourth waveguide sections, each having an input end and an output end; first symmetrical directional coupler means between said first and second sections; second symmetrical directional coupler means between said first and fourth sections; third symmetrical directional coupler means between said second and third sections; said couplers each having substantially a one-to-one coupling ratio; said first coupler being nearer to the input end of said first section than said second coupler and nearer to the input end of said second section than said third coupler; and an individual mixer means connected to the output end of each section.

8. A waveguide circuit for mixing power at one frequency with each of two signals having frequencies different from said one frequency comprising: first, second, third, and fourth waveguide sections, each having an input end and an output end; a substantially non-reflective termination in the input end of said second section; first symmetrical directional coupler means between said first and second sections; second symmetrical directional coupler means between said first and fourth sections; third symmetrical directional coupler means between second and third sections; said couplers each having substantially a one-to-one coupling ratio; said first coupler being nearer to the input end of said first section than said second coupler and nearer to the input end of said second section than said third coupler; and an individual mixer means connected to the output end of each section.

9. A waveguide circuit for mixing power at one frequency with each of two signals having frequencies different from said one frequency comprising: first, second, third and fourth waveguide sections, each having an input end and an output end; a first common wall between said first and second sections, and first symmetrical directional coupler means therein; a second common wall between said first and fourth sections, and second symmetrical directional coupler means therein; a third common wall between said second and third sections, and third symmetrical directional coupler means therein; said first coupler being nearer to the input end of said first section than said second coupler and nearer to the input end of said second section than said third coupler; and an individual mixer means connected to the output end of each section.

10. A waveguide circuit for mixing power at one frequency with each of two signals having frequencies different from said one frequency comprising: first, second, third and fourth rectangular waveguide sections, each having an input end and an output end; a common narrow wall between said first and second sections, and first symmetrical directional coupler means therein; a common wide wall between said first and fourth sections, and second symmetrical directional coupler means therein; a common wide wall between said second and third sections and third symmetrical directional coupler means therein; said first coupler being nearer to the input end of said first section than said second coupler and nearer to the input end of said second section than said third coupler; and an individual mixer means connected to the output end of each section.

11. A waveguide circuit for mixing power of one frequency with each of two signals having frequencies different from said one frequency comprising: first, second, third, and fourth rectangular waveguide sections, each having an input end and an output end; a common narrow wall between said first and second sections, and first symmetrical directional coupler means therein; a common wide wall between said first and fourth sections, and second symmetrical directional coupler means therein; a common wide wall between said second and third sections and third symmetrical directional coupler means therein; said first coupler being nearer to the input end of said first section than said second coupler and nearer to the input end of said second section than said third coupler; a substantially non-reflective termination in the input end of said second section, and an individual mixer means connected to the output end of each section.

12. A waveguide circuit for mixing power at one frequency with each of two signals having frequencies different from said one frequency comprising: first, second, third and fourth rectangular waveguide sections, each having an input end and an output end; a common narrow wall between said first and second sections and first symmetrical directional coupler means therein; a common wide wall between said first and fourth sections, and second symmetrical directional coupler means therein; a common wide wall between said second and third sections, and third symmetrical directional coupler means therein; said couplers each having substantially a one-to-one coupling ratio; said first coupler being nearer to the input end of said first section than said second coupler and nearer to the input end of said second section than said third coupler; and an individual mixer means connected to the output end of each section.

13. A waveguide circuit for mixing power at one frequency with each of two signals having frequencies different from said one frequency comprising: first, second, third and fourth rectangular waveguide sections, each having an input end and an output end; a common narrow wall between said first and second sections and first symmetrical directional coupler means therein; a common wide wall between said first and fourth sections, and second symmetrical directional coupler means therein; a common wide wall between said second and third sections, and third symmetrical directional coupler means therein; said couplers each having substantially a one-to-one coupling ratio; said first coupler being nearer to the input end of said first section than said second coupler and nearer to the input end of said second section than said third coupler, a substantially non-reflective termination in the input end of said second section, and an individual mixer means connected to the output end of each section.

14. A transmission line circuit for mixing power at one frequency individually with each of two signals each at a frequency different from said one frequency comprising: first, second, third and fourth transmission line sections, each having an input end and an output end; first symmetrical directional coupler means between said first and second sections; second symmetrical directional coupler means between said first and fourth sections; third symmetrical directional coupler means between said second and third sections; said first coupler being nearer to the input end of said first section than said second coupler and nearer to the input end of said second section than said third coupler; first, second, third, and fourth means for detecting difference frequencies connected to the output ends of said first, second, third and fourth sections, respectively; first push-pull amplifier means connected to the outputs of said first and fourth detecting means for amplifying the difference frequency of frequencies introduced at the input ends of said first and fourth sections; and second push-pull amplifier means connected to the outputs of said second and third detecting means for amplifying the difference frequency of frequencies introduced at the input ends of said first and third sections.

15. A transmission line circuit for mixing power at one frequency individually with each of two signals each at a frequency different from said one frequency comprising: first, second, third, and fourth transmission line sections, each having an input end and an output end; first symmetrical directional coupler means between said first and second sections; second symmetrical directional coupler means between said first and fourth sections; third symmetrical directional coupler means between said second and third sections; said first coupler being nearer to the input end of said first section than said second coupler and nearer to the input end of said second section than said third coupler; first, second, third and fourth means for detecting difference frequencies connected to the output ends of said first, second, third and fourth sections, respectively; first push-pull amplifier means connected to the outputs of said first and fourth detecting means for amplifying the difference frequency of frequencies introduced at the input ends of said first and fourth sections; second push-pull amplifier means connected to the outputs of said second and third detecting means for amplifying the difference frequency of frequencies introduced at the input ends of said first and third sections; and a substantially non-reflective termination in the input end of said second section.

HENRY J. RIBLET.

REFERENCES CITED

The following references are of record in the file of this patent:

UNITED STATES PATENTS

| Number | Name | Date |
|---|---|---|
| 2,059,601 | Peterson et al. | Nov. 3, 1936 |
| 2,382,693 | Dallenbach et al. | Aug. 14, 1945 |
| 2,410,387 | Mueller | Oct. 29, 1946 |
| 2,462,893 | Pontecorvo | Mar. 1, 1949 |
| 2,468,166 | Bruck | Apr. 26, 1949 |
| 2,468,237 | Sanders | Apr. 26, 1949 |

OTHER REFERENCES

"A New Type of Waveguide Directional Coupler," Proc. Institute of Radio Engineers, January 1948.

"Directal Couplers," Proc. Institute of Radio Engineers, February 1947.

"A Mathematical Theory of Directional Couplers," Proc. IRE, November 1947.